(12) United States Patent
Buelna et al.

(10) Patent No.: US 7,374,683 B2
(45) Date of Patent: May 20, 2008

(54) BIOFILTER AND METHOD FOR FILTERING A WASTE LIQUID

(75) Inventors: Gerardo Buelna, Québec (CA); Rino Dubé, Beauport (CA); Yann Le Bihan, Cap-Rouge (CA)

(73) Assignee: Centre de Recherche industrielle du Québec, Quebec (CA)

( * ) Notice: Subject to any disclaimer, the term of this patent is extended or adjusted under 35 U.S.C. 154(b) by 74 days.

(21) Appl. No.: 11/393,757

(22) Filed: Mar. 31, 2006

(65) Prior Publication Data
US 2007/0227972 A1    Oct. 4, 2007

(51) Int. Cl.
*C02F 3/30* (2006.01)

(52) U.S. Cl. .................. 210/603; 210/617; 210/630; 210/150; 210/188

(58) Field of Classification Search ................ 210/603, 210/605, 615, 617, 630, 150, 151, 188
See application file for complete search history.

(56) References Cited

U.S. PATENT DOCUMENTS

| | | | | |
|---|---|---|---|---|
| 808,411 A | * | 12/1905 | Venable | 210/150 |
| 848,279 A | * | 3/1907 | Ashley | 210/150 |
| 2,308,866 A | * | 1/1943 | Dekema | 210/617 |
| 4,696,747 A | * | 9/1987 | Verstraete et al. | 210/150 |
| 4,800,021 A | * | 1/1989 | Desbos | 210/150 |
| 4,849,360 A | * | 7/1989 | Norris et al. | 210/150 |
| 4,997,568 A | | 3/1991 | Vandervelde et al. | |
| 5,080,793 A | * | 1/1992 | Urlings | 210/617 |
| 5,298,164 A | * | 3/1994 | Hapach et al. | 210/615 |
| 5,800,709 A | | 9/1998 | Smith | |
| 5,972,219 A | * | 10/1999 | Habets et al. | 210/605 |
| 6,100,081 A | | 8/2000 | Buelna | |
| 6,291,233 B1 | | 9/2001 | Saha et al. | |
| 6,478,963 B1 | * | 11/2002 | Rossmanith | 210/603 |
| 6,569,322 B1 | | 5/2003 | Stoessel | |
| 6,602,407 B2 | | 8/2003 | Talbot et al. | |
| 6,620,321 B2 | | 9/2003 | Festa et al. | |
| 6,696,284 B2 | | 2/2004 | Haridas et al. | |
| 6,846,666 B2 | | 1/2005 | Kumar et al. | |
| 6,936,170 B2 | | 8/2005 | Shieh et al. | |

* cited by examiner

*Primary Examiner*—Christopher Upton
(74) *Attorney, Agent, or Firm*—Jean Claude Boudreau

(57) ABSTRACT

The biofilter is used for the purification of a waste liquid using layers of filtering material, wherein the waste liquid moves downwardly by gravity while an $O_2$-containing gas moves upwardly therein. The biofilter comprises a gas collector to capture at least a portion of the gas moving upwardly therein to mitigate the problem of biofilter clogging due to a microbial seal at the surface of the uppermost filtering layer.

10 Claims, 2 Drawing Sheets

BIOFILTER AND METHOD FOR FILTERING A WASTE LIQUID

BACKGROUND

The potential of filtration for the purification of waste liquids and waste gases in biofilters has been recognized due to its efficiency and low cost. Typically, an organic support in a biofilter directly retains or fixes different types of pollutants and can act as a support for various types of microorganisms capable of degrading the pollutants. The constituents of organic supports, lignin and organic acids in particular, possess numerous functional polar groups conferring them a good absorption capacity for organic molecules as well as transition metals.

One of the organic supports that are typically used is peat. Peat is a polar and highly porous material, in addition to being inexpensive and easy to use. It is capable of adsorbing many undesirable elements and reducing their level from the environment. It removes pollutants and microbial activity from waste liquids by adsorption and absorption reactions. Peat is also effective at removing suspended solids, nutrients, heavy metals, organic matter, oils, odors and bacteria.

Several designs of biofilters to treat domestic waste liquids have been developed in the past. They are usually composed of four layers, namely a bottom layer of coarse gravel, a layer of sand, a layer of peat and an upper layer of grass. The two bottom layers act as a support to retain the peat bed. These biofilters are generally used for the treatment of small volumes of waste liquids. A biofilter exhibiting higher filtering capacity for the purification of agricultural, municipal or industrial waste water is disclosed in U.S. Pat. No. 6,100,081 to Buelna and naming the same assignee as the present application. That biofilter makes use of a filtering media formed by a succession of layers including a filtering carrier material such as peat and a structural carrier material such as wood chips in a sufficient amount to prevent compaction of the filtering material and channels formation, whereby the waste water and an $O_2$-containing gas can flow to perform pollutant degradation by microorganisms. More particularly, the media is characterized by increasing the filtration capacity in a direction of flow of the waste water to prevent clogging of the filtering material.

Some other prior art biofilters make use of inert granular filtering medias, such as the biological reactor adapted to purify sewage or water disclosed in U.S. Pat. No. 4,997,568 to Vandervelde et al. That biological reactor includes an inverted conic, water impermeable chamber receiving at the apex thereof contaminated water or sewage that then flows upwardly and radially through layers of filtering media providing progressive treatment by reduced pore size and increased surface area as the flow proceed to the periphery. The layers of media are constructed and arranged to provide passive ambient air contact at an upper surface of the layers and to provide an extended residence time to the water or sewage being treated.

Another type of biological aerated filter using inert filtering media is disclosed in U.S. Pat. No. 5,800,709 to Smith. This filter is in the form of a treatment vessel including a high voidage, coarse granular media bed lying on a grid and located above a low voidage, fine granular media bed, which media beds are separated by an intermediate section containing a surplus treated water outlet for recycling and a washout collector. An $O_2$-containing gas is supplied, which gas may flow upwards through all of the media beds, or be completely removed from the intermediate section to prevent $O_2$ from the lower aerated media from passing to the upper flooded anoxic media bed.

Although biofilters have been used with success over the years, there is still a need to improve them and solve some of their drawbacks, especially for treatment of highly polluted liquids. For instance, low maintenance, non-backwash type biofilters currently in use are not designed to alleviate the formation of a compact microbial layer at the surface of the filtering material over long period of operation, typically more than one year. This microbial layer generally leads to the formation of a clogging layer on the filtering material inside the biofilter, thus promoting the formation of preferential gas pathways where aeration is used. This significantly lowers the life-span and efficiency of the biofilter.

SUMMARY

It is therefore an object of this invention to provide an improved biofilter and method for filtering a waste liquid, including a polyvalent biofilter and method where the typical problems of clogging of the filtering material are mitigated.

In one aspect, there is provided a biofilter for purifying a waste liquid, the biofilter comprising: a housing having an upper portion and a lower portion; a waste liquid inlet located in the upper portion of the housing; at least one layer of filtering material substantially comprised of organic material contained in the housing and disposed to receive the waste liquid therethrough, for supporting microorganisms capable of degradation of pollutants contained in the waste liquid under action of $O_2$; forced $O_2$-containing gas supply in gas communication with an inlet located in the lower portion of the housing; a purified liquid outlet located in the housing below the gas inlet; and a gas collector located in the housing below at least a portion of said layer and above the gas inlet to retrieve at least some of the gas from inside the housing, for progressively reducing the remaining gas passing through said layer portion to control the proliferation of said microorganisms thereby limiting filter material clogging.

In another aspect, there is provided a method of purifying a waste liquid in a biofilter having at least one layer of filtering material substantially comprised of organic material for supporting microorganisms capable of degradation of pollutants contained in the waste liquid under action of $O_2$, the method comprising: providing the waste liquid through said layer, the waste liquid generally flowing downwards by gravity; supplying a forced $O_2$-containing gas at a level that is below said layer, the gas generally flowing upwards; retrieving at least some of the upwardly moving gas inside the biofilter at a level that is below at least a portion of said layer and that is above the level at which the $O_2$-containing gas is supplied, for progressively reducing the remaining gas upwardly moving through said layer portion to control the proliferation of said microorganisms thereby limiting filter material clogging; and retrieving a purified liquid from inside the biofilter at a level that is below where the $O_2$-containing gas is supplied.

DETAILED DESCRIPTION

Figure 1:
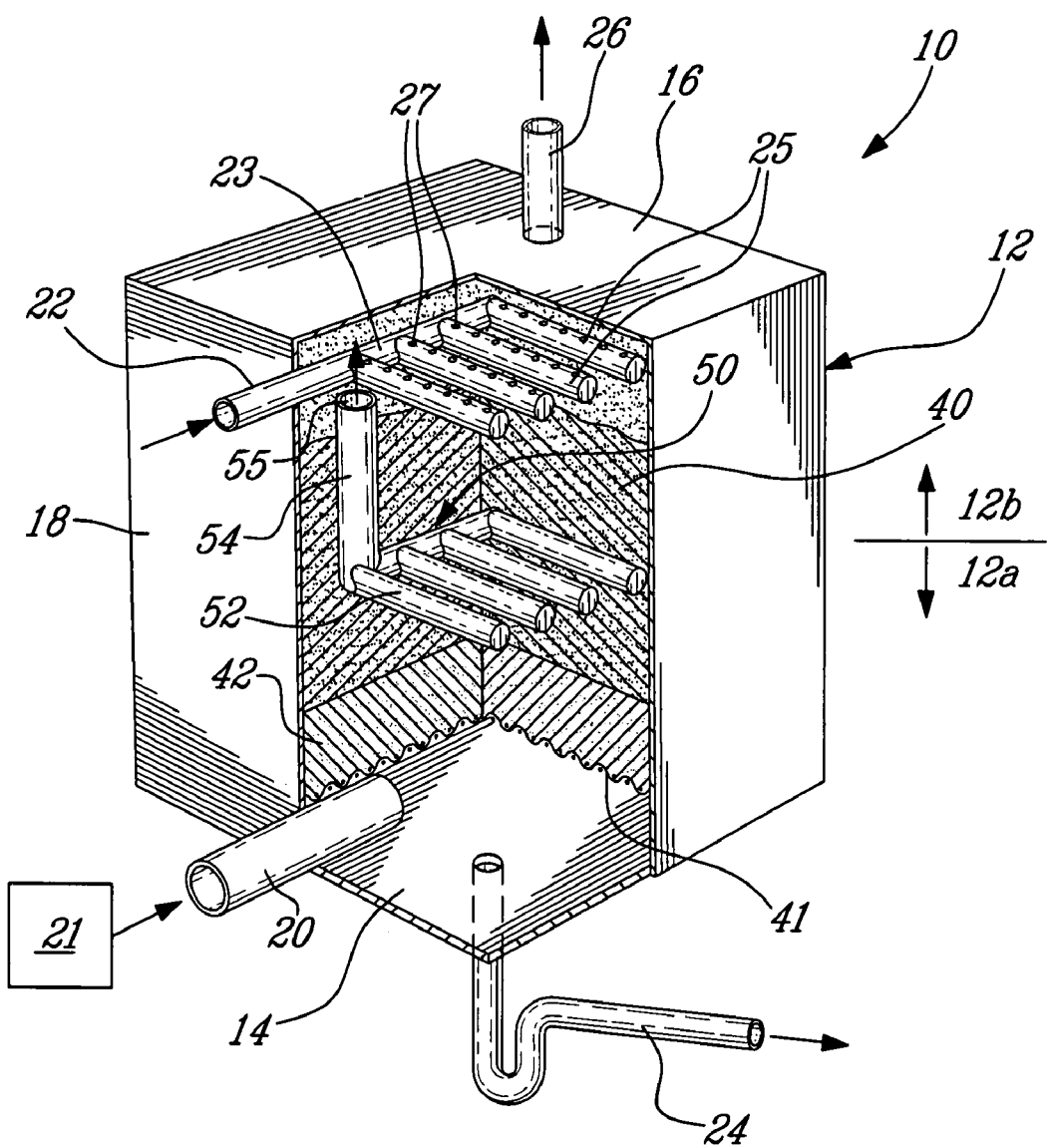
FIG. 1 is a perspective and partially-cutaway view of an example of an improved biofilter for the purification of a waste liquid.

All terms and expressions used herein are intended to have the meanings commonly understood by those of ordinary skill in the art to which this invention pertains. However, some terms and expressions with commonly understood meanings are defined herein for clarity and the inclusion of such definitions herein should not necessarily be construed to represent a substantial difference over what is generally understood in the art.

The term "filter" as used herein is intended to mean a porous object or mass that serves as a medium for at least partially separating matter held in suspension, dissolved impurities or solid matter from a liquid or a gas passing through it. It can also mean a device or a porous substance through which a gas or a liquid is passed in order to remove solids or impurities. A biofilter is a filter in which microorganisms naturally grow or are inoculated to the filtering mass.

A biofilter, in addition of separating solid particles from a liquid fraction, performs the action, through the microbial actions, of digesting or degrading some parts or particles of the solid or the liquid portions, depending on the needs. Some pollutants, such as phosphorous or nitrogenous compounds, can be metabolized by the microbes or transformed to be environmentally acceptable or compatible, and therefore less pollutant. The microorganisms can be attached to the filtering particles or mass, or can be growing freely or proliferating therethrough.

The term "retention" as used herein is intended to mean the capacity of filtering material or mass to retain solid particle therein (solid retention) as well as its capacity to retain some liquid (hydraulic retention) and let the remaining liquid or non retained fraction flow therethrough. The higher the retention of a filtering material is, the lesser are the solid particles passing through the filtering material. The retention of a filtering system can be adjusted by varying the size of the filtering particles or by changing the porosity of the filtering material through a proper selection and blend of its constituents. While reducing retention, the use of larger particles or more porous filtering material generally makes the filtering material more permeable to ambient or supplied $O_2$-containing gas promoting the proliferation of aerobic microorganisms.

The expression "filtering material" is meant to include a wide variety of materials of an inert nature, an organic nature or both. In general, it is to be understood that the filtering material is composed of particles sized to provide a reasonable adsorbing and absorbing surface, as well as an acceptable flow resistance. An organic matter typically used for constituting the filtering material is peat, due to its properties. The peat can be treated physically, chemically or both in order, for example, to eliminate problems including but not limited to color-leaching or clogging. The peat fibers are selected as having a Von Post index of 2 to 6, preferably of 3 to 4, compactness of about 0.68, density from about 100-110 $Kg/m^3$, porosity of about 0.9, specific area of about 200 $m^2/g$, and grain size of about 0.5-1 cm. The peat fibers can be mixed with a pre-determined concentration of alkaline substances such as marl, limestone or calcium carbonate ($CaCO_3$) for counteracting acidification thereof while promoting nitrogenous fractions removal, and a pre-determined concentration of Fe-containing compound or equivalent. The addition of lime and iron-containing compounds allows efficient elimination of total phosphorus from the waste liquid and avoids color leaching problems. Wood shavings, barks or both can be used as structural carrier materials composing the filtering material. The structural carrier material such as coniferous bark and wood shavings acts also as a support material for colonization and growth of microorganisms, permitting a more even distribution of gases and liquids throughout the filtering material, preventing packing and delaying the aging thereof. Wood shavings showing compactness of about 0.52, density from about 140-160 $Kg/m^3$, porosity from about 0.89-0.9, and grain size of about 2-5 cm can be used. Coniferous barks showing compactness of about 0.61, density from about 170-220 $Kg/m^3$, porosity from about 0.85-0.88, and grain size of about 2-5 cm can be used. Alternately, sawdust showing compactness of about 0.65, density from about 140-160 $Kg/m^3$, porosity from about 0.89-0.9, and grain size of about 1-2 cm can also be used.

The expression "waste liquid" is intended to include but is not limited to industrial, agricultural and municipal waste water. Examples of such waste liquids include liquid effluents from composting centers; dairies; animal farms, including pig, cattle, horse, chicken, fox, mink and fish farms; canning factories; effluents from the pulp and paper industry, the chemical industry or the mining industry, slaughter house wastes; animal wastes; domestic sewage; and domestic septic tanks effluents. A waste liquid can include more than one type of waste or be a mix of waste liquids from two or more sources.

The term "pollutant" should be taken in a broad sense so as to include metals, including heavy metals, organic compounds, ascetic or basic dies, oils, phenols, benzene, toluene, xylene, volatile organic compounds, carbonated aliphatic or cyclic compounds, chlorinated compounds, sulfated compounds, phosphorous or nitrogenous compounds, aldehydes and organic acids; effluents from the pulp and paper industries; bacteria such as fecal coliforms; effluents from slaughter houses; domestic waste liquid treatment; nutrients; land field leachate treatment; hydrocarbons; pesticides; effluents from chemical industries; toxic waste; and odorous gases, such as dimethylamine, ammonia and hydrogen sulfides.

The term "microorganism" is used in a broad sense and should be understood as referring mainly but not exclusively to bacteria, yeasts, molds, fungi and combinations thereof. The pollutants to be removed by the biofiltration are adsorbed and absorbed by the filtration material and often converted by microorganisms under (aerobic) or without (anaerobic) action of $O_2$ into non-harmful substances such as $CO_2$ and $H_2O$. It should be understood that the microflora can be adapted to the type of pollutant to be removed from the waste liquids. It should also be understood that the filtration material might contain a microflora which is adapted for the purification of a particular pollutant or family thereof. Examples of microorganisms that can grow on the filtering material include, but are not limited to, aerobic growth microorganisms such as, *Streptomyces* sp., *Achromobacter xylosoxidans*, *Pseudomonas* sp., *Nitrosomonas* sp., *Nitrobacter* sp., *Penicillium* sp., *Bacillus* sp. and *Micrococcus* sp. In some cases it might be beneficial to biostimulate the filtering material by providing nutrients thereto. A portion of the filtering material can support microorganisms adapted for growing in anaerobic condition. For example, *Pseudomonas* sp., *Vibrio* sp. and *Bacillus* sp. being facultative microorganisms, they can grow under or without action of $O_2$.

Referring now to FIG. 1, there is shown an example of an improved biofilter 10 provided for the purification of a waste liquid. This biofilter 10 and the method described herein are an improvement over what is disclosed in U.S. Pat. No. 6,100,081 issued Aug. 8, 2000 to Buelna, the content of which is hereby incorporated by reference. Nevertheless, the improvements can also be applied to other kinds of biofilters using organic or inert filtering materials.

The biofilter 10 comprises a housing 12 for containing the filtering material, which has a bottom wall 14, a top wall 16 and side walls 18. It is to be understood that the housing 12 may exhibit any other appropriate shape such as cylindrical, and may be made of a watertight, rigid material such as metal, plastic or composite (ex. fiberglass). In a case of a buried biofilter, a watertight, flexible material such as synthetic web can be also used. One of the side walls 18 of the housing 12 is provided with an $O_2$-containing gas inlet 20 in its lower portion 12a connected to a forced gas supply 21, and a waste liquid inlet 22 in its upper portion 12b, conveniently located through the side wall 18 in the example of FIG. 1. Conveniently, the $O_2$-containing gas supplied may be pumped ambient air, or polluted air requiring a treatment performed simultaneously to the waste liquid treatment within a same biofilter. The gas inlet 20 is received within a plenum defining a cavity located at the lower portion of the housing 12 below the filtering material, permitting the air to be distributed while allowing purified liquid to flow toward an outlet 24. The waste liquid inlet 22 is provided with a water distributor 23 having protruding branches 25 provided with perforations 27 preferably located on the upper portion of the branches 25, thereby ensuring that only the overflow of waste liquid entering the branches 25 will pass through the perforations 27 and be discharged in the space between the surface of the filtering material and the top wall 16. Alternatively, the distributor 23 can be in the form of a rotary ramp as well known in the art.

The bottom wall 14 of the housing 12 is provided with the purified liquid outlet 24 located below the gas inlet 20. The top wall 16 is provided with a gas vent 26 located above the waste liquid inlet 22. Contained inside the housing 12 is at least one layer of filtering material designated at 40 that may be composed of a filtering carrier material including peat and wood shavings. It acts as a filtering layer for retaining suspended and dissolved polluting matter and degrading polluting matter through the activity of the microorganisms, to ensure that the liquid reaching the liquid outlet 24 has been substantially purified. The filtering layer 40 preferably lays on a bottom layer 42 made of a structural carrier material for preventing the filtering material of layer 40 to be washed out through grid 41 on which layer 42 is supported.

A gas collector 50 is provided in the housing below at least a portion of layer 40 and above the gas inlet 20. The layer portion is typically located within upper half of layer 40, preferably constituting upper third thereof. In use, the gas collector 50 retrieves at least some of the gas from inside the housing 12, for progressively reducing the remaining gas passing through layer portion to control the proliferation of the microorganisms and thereby limiting filter material clogging.

The illustrated gas collector 50 has ramifications or branches 52 provided with perforations, some of which being oriented towards the bottom for preventing accumulation of liquid therein. The gas collector 50 is preferably disposed within a sufficient amount of a structural carrier material characterized by coarse grain size such as wood chips to promote gas circulation and prevent gas collector clogging by the filtering material of layer 40. The design parameters of the gas collector, such as number, length and inner diameter of branches, perforation diameter, etc., are determined to offer a predetermined resistance to the gas flowing through the filtering layer. Experience has shown that a gas resistance equivalent to about 1 KPa ensures an optimal gas retrieval rate extending the biofilter life-span while offering operation stability and process efficiency. In the example shown in FIG. 1, the branches 52 are in gas communication with a duct 54 provided on the gas collector 50 and having an outlet 55 located above the filtering layer 40, within the space between the surface of the filtering material and the top wall 16. Preferably, one or more further ducts (not shown) are provided on the gas collector at spaced locations thereon. The vent 26 being in gas communication with the gas collector 54, it allows the collected gas to escape out of biofilter housing 12 while providing some passive aeration of the filtering layer at the surface thereof. Alternatively, the gas collector outlet 52 could communicate directly with the outside of the housing 12, by extending through top wall 16 or any one of side walls 18. Optionally, a fluid restricting device such as a valve (not shown) can be provided at outlet 55 to set the level of resistance offered to the circulating gas at a desired value.

In use, the waste liquid flows out of the waste liquid inlet 22 through the water distributor 23 and reaches the upper surface of the filtering material. The waste liquid percolating by gravity is then progressively purified through the filtering material by way of adsorption, absorption and biodegradation. The waste liquid also provides the humidity and nutrients required for the optimum activity of the biofilter 10, as it contributes the necessary humidity and nutrients for the activity of the microorganisms colonizing the various layers of the filtering material. In addition, the humidity of the biofilter 10 can dissolve liquid-soluble substances passing in the filtering material.

In absence of a gas collector as in the case of prior art biofilters, as microorganisms proliferate and retained matter accumulates within the upper portion of the filtering layer, the resistance encountered by the gas moving upward through the filtering layer may cause a gas pressure increase therein, which adversely affects percolation of the liquid through the filtering layer in counterflow with respect to the upwardly moving gas, and may promote the formation of preferential gas pathways having detrimental effects on $O_2$ distribution within the filtering layer.

According to the principle of the present invention, at a starting step of the filtering process, the gas (ex. air) fed to the biofilter freely moves upwards through the filtering material of the layer(s) located above the gas collector, promoting the growth of a microbial mass or layer within the filtering material, mostly at the surface thereof. This microbial mass is comprised of various types of microorganisms that can be aerobic, anaerobic or facultative. Anaerobic microorganisms are mostly found in filtering material areas through which the gas diffuses less freely. As the surface microbial layer grow and filtered matter accumulates on the filtering material over time, the latter offers an increasing resistance to the gas flow due to the formation of the microbial layer and accumulated retained matter, and the gas is progressively bypassed through the gas collector, since the resistance offered by the filtering material to the upwardly circulating gas as compared to the predetermined gas resistance offered by the gas collector progressively increases. As a result, an increasing flow of gas is retrieved by the gas collector as compared to the flow of remaining gas passing through the filtering layer upper portion. The importance of such phenomenon increases over time until most of the fed gas is retrieved by the gas collector. For example, at the early stage of biofilter operation, the gas collector may retrieve as less as about 5% of the volume of gas entering the biofilter through the gas inlet, while it may retrieves substantially 100% of the supplied gas after a long period of biofilter operation. In the latter condition of operation, for a biofilter embodiment having a gas collector outlet communicating directly with the outside of the housing, the biofilter vent may act as an ambient air inlet rather that a gas outlet, thereby promoting some passive aeration of the filtering layer at the surface thereof. Particularly in a case where there is an uppermost layer having a retention capacity lower that of the filtering layer located just above the gas collector, the forced aeration mode of biofiltration acting within that uppermost layer is gradually replaced by a passively aerated mode of biofiltration, and aerobic microorganisms that were dominant in early biofiltering conditions mostly remain within passively aerated areas at the surface of the filtering material where the amount of diffused $O_2$ is sufficient for aerobic microbial growth. Within the filtering material areas through which neither passive aeration nor forced aeration is sufficient to sustain aerobic microbial growth, anaerobic and facultative microorganisms become dominant as they proliferate while continuing degradation of the pollutants. As a result, in spite of the progressive change of aeration conditions occurring within the filtering layer(s) located above the gas collector, the waste liquid passing through the upper portion of the filtering material is sufficiently purified to prevent a significant microbial growth further through the filtering material toward the gas collector. Furthermore, the filtering material present below the gas collector being continuously aerated, further purification of the liquid passing therethrough is provided prior to reach biofilter outlet.

In the embodiment depicted in FIG. 1, the filtering material is substantially comprised of organic material which can be composted. However, inert filtering carrier material such as activated carbon and different types of inert structural carrier material can also be used, such as stones (volcanic or any other appropriate type) or gravel.

The quality of the microorganism population to be grown in the biofilter 10 depends on the composition of the waste liquids to be purified. While it is contemplated that the filtering material of the biofilter 10 will be naturally inoculated by the microorganism population present in the waste liquid, specific microorganisms suited to the purification of specific pollutants (such as toxic substances) can be chosen and inoculated in the biofilter 10. As well, they can be mixed with the filtering material at the time of setting up of the biofilter 10.

It is also contemplated that in certain situations, a plurality of biofilters may be connected to one another in series. If desired, the different biofilters connected to one another, can be adapted to purify different types of waste liquids. Also contemplated is a pretreatment of the waste liquid to be purified through the biofilter 10, the pretreatment being effected by conventional methods such as by using a septic tank, a pond or a physicochemical treatment unit.

It should be understood that the special geometry of the different layers can be varied according to the need and the aimed performance of the biofilter 10. Thus, the design of the different layers inside the biofilter 10 will be based on the aimed efficiency of the purification of the pollutants to be purified, as well as the desired rate of filtration. For example, more layers could be added, resulting for example in a decreased rate of filtration, without a decrease in efficiency. Conversely, the number of layers could be reduced, thereby increasing the rate of filtration. Since some pollutants are easier to purify than others, a reduction in the number and thickness of layers could still permit an efficient purification of a specific type of pollutant. The filtering material is chosen so as to ensure the maximum structural stability of the biofilter 10, for example by avoiding compaction and clogging, and also to limit temporal discharge of pollutants adsorbed to the filtering material.

Figure 2:
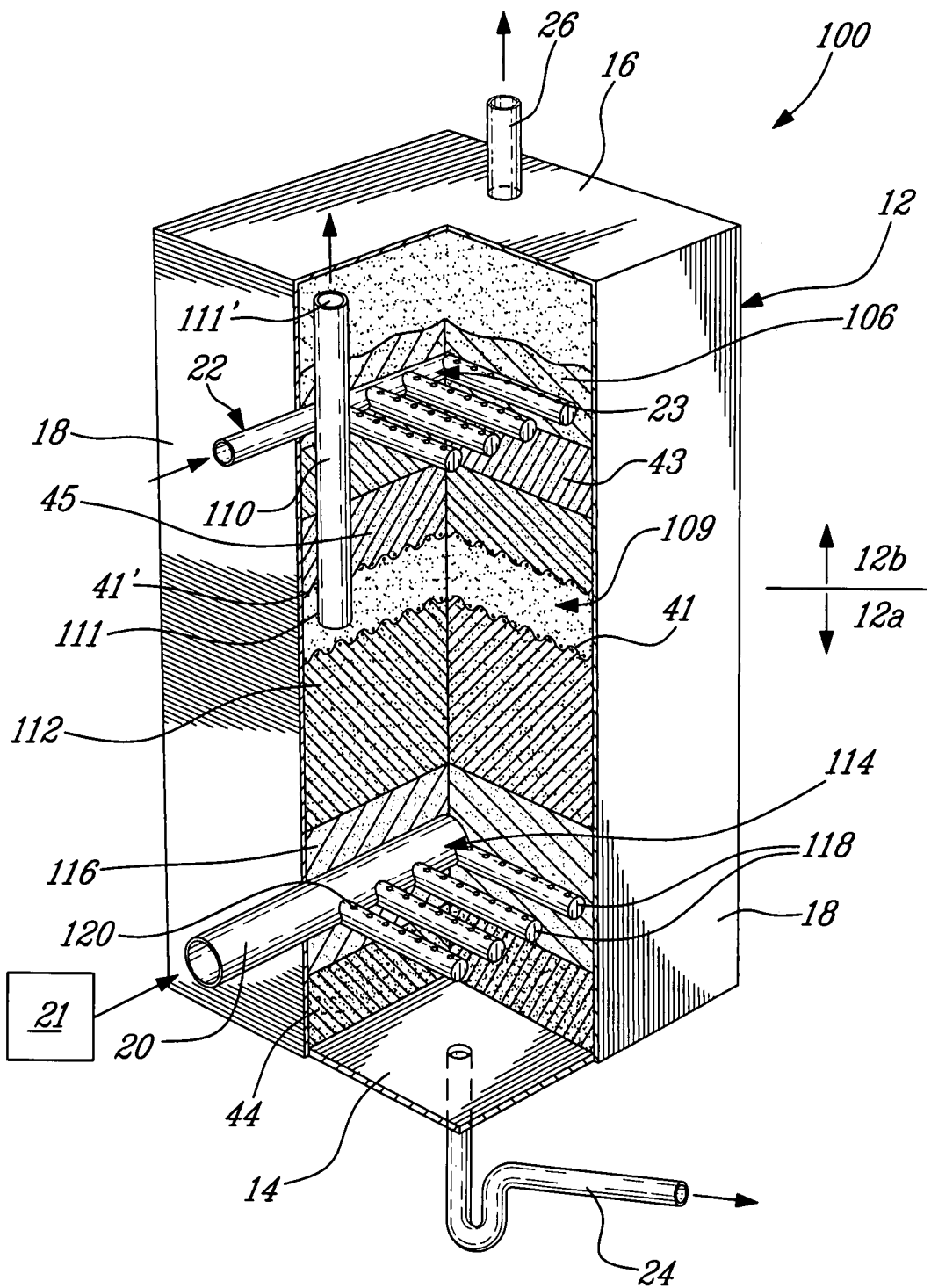
FIG. 2 is a perspective and partially-cutaway view of another example of an improved biofilter.

FIG. 2 illustrates a variant of the biofilter 10 shown of FIG. 1. As can be seen, the biofilter 100 comprises a waste liquid inlet 22 provided with a water distributor 23 disposed within an uppermost layer 106 preferably composed of a structural carrier material characterized by coarse grain size to promote uniform distribution of the waste water throughout the filtering area delimited by the housing 12. Such water distribution layer 106 may typically comprise a blend of wood shavings and coniferous bark. The biofilter 100 shown in FIG. 2 further includes a succession of filtering layers supported on a grid 41' which includes layer 43 superjacent to layer 45, in which layer 43 has a retention capacity lower than that of layer 45 to reduce surface clogging while promoting passive aeration of layers 43, 45 which contributes to maintain some biodegradation activity within these layers as the remaining gas passing therethrough is progressively reduced. Such lower retention characteristic of layer 43 can be obtained through the use of a porous, coarse grain size material such as volcanic stones (pozzolan) or wood chips, while a typical blend of peat and wood chips preferably forms layer 45. The biofilter 100 further includes a gas collector in the form of a plenum 109 located between the two grids 41 and 41' with a duct 110 having its inlet end 111 disposed within the plenum 109 which forms a cavity into the housing 12 from which at least some of the upwardly moving gas is retrieved and flows through duct outlet 111', then to be discharged outside the housing 12 through vent 26. Optionally, a fluid restricting device such as a valve (not shown) can be provided at outlet 111' to set the level of resistance offered to the circulating gas at a desired value. One or more filtering layers such as layer 112 can be provided below the gas collector 110 which layer typically includes a blend of peat and wood chips preferably exhibiting a higher retention capacity as compared to layer 45 by adding more peat in the blend. Located in the lower portion 12a of the housing 12 is an $O_2$-containing gas inlet 20 provided with a gas distributor 114 located in a layer 116 preferably composed of a structural carrier material characterized by coarse grain size such as wood chips to promote uniform distribution of the waste gas moving upwards throughout the filtering area delimited by the housing 12. To ensure that a sufficient amount of well aerated filtering material is available to perform purification of the liquid according to the desired performance, the layer 112 is located above the $O_2$-containing gas inlet 20. The gas distributor 114 has branches 118 provided with perforations 120 allowing an upward circulation of the gas, some of which are downwardly oriented for preventing accumulation of liquid within branches 118. In the example shown in FIG. 2, the layer 116 rests on a bottom layer of coarse stones 44 for preventing washout of filtering material while allowing a purified liquid to flow toward outlet 24.

As can be appreciated, the gas collector provided in the biofilter results in that the microorganisms at the surface of the filtering material have less gas, the formation of a microbial layer at the surface of the filtering material and associated clogging thereof are reduced, thus reducing the preferential gas pathways inside the filtering material, thereby improving the uniformity of the flow of liquid and gas through the filtering material.

EXAMPLE

Two main, 16-meter cylindrical biofilters according to the invention and working in parallel were used as part a hog manure treatment plant further including a physicochemical pretreatment unit receiving the raw manure to feed the biofilters with a waste liquid characterized by reduced content of suspended solids and phosphorus. The purified liquid retrieved from the main biofilters was then directed to a polishing biofilter as part of the treatment plant prior to be safely discharged to the environment. Each biofilter was supplied with stale air drawn from the hog husbandry building to oxygenate the filtering material and deodorizing the air, while contributing to maintain proper temperature conditions for the biofilters during winter. Biofiltering efficiency data based on input/output liquid characteristics, namely 5-days biochemical oxygen demand ($BOD_5$), total suspended solids (TSS) and total Kjeldahl nitrogen (TKN), measured during a two (2) years period of treatment at a average rate of 10 $m^3$/day of manure, are shown in Table 1.

TABLE 1

| Characteristic | Number of samples | Biofilters input Average (range) (mg/l) | Average applied load (kg/$m^2$/day) | Biofilters output Average (range) (mg/l) | Efficiency (%) |
|---|---|---|---|---|---|
| $BOD_5$ | 68 | 12 700 (9000-17 000) | 0.3 | 55 (6-830) | 99.6 |
| TSS | 66 | 390 (120-1550) | 0.009 | 50 (3-340) | 87.1 |
| TKN | 38 | 2250 (1670-2930) | 0.053 | 120 (10-390) | 94.6 |

A very stable operational behavior of the biofilters was observed over the considered duration, without any significant formation of preferential gas pathways. With an average applied $BOD_5$ load of 0.3 kg/$m^2$/day, no significant surface clogging was observed and therefore no maintenance of the filtering material was required. Air pressure rise at the air inlet was limited to about 1 kPa as compared to a pressure rise of up to 3 kPa that has been typically observed when using a similar type of biofilter not provided with a gas collector according to the invention. As the microorganisms were proliferating within the upper portion of the filtering material over the considered period of operation, a rise in gas retrieval rate was observed as well as a corresponding drop of the remaining gas flowing rate through the upper portion of the filtering material, as can be appreciated from the flow rate estimation data given in Table 2.

TABLE 2

| Period phase | Average proportion of retrieved gas (%) |
|---|---|
| 0 to 3 months | 25 |
| 3 to 9 months | 50 |
| 9-24 months | 75 |

The data shown in Table 2 represent rough estimations of average proportion of retrieved gas over three representative phases of a two-year period of operation of a biofilter provided with a gas collector according to the invention. It was estimated that the gas collector can retrieve up to 100% of the gas inside the filtering material beyond the tested period.

While the invention has been described in connection with specific embodiments thereof, it will be understood that it is capable of further modifications and this application is intended to cover any variations, uses, or adaptations of the invention. For instance, the gas inlet 20 with gas distributor 114 as shown in FIG. 2 may be replaced by a gas inlet such as described with respect to the embodiment shown in FIG. 1, wherein a plenum is used to ensure proper gas distribution. Similarly, the gas collector 110 with associated plenum can be replaced by a gas collector with perforated branches as also described in view of FIG. 1. The embodiment shown in FIG. 1 can be modified by adding one or more filtering layers superjacent to filtering layer 40 and having lower retention capacity as compared thereto, as superjacent filtering layers 43,45 described above with respect to the embodiment shown in FIG. 2. Moreover, the biofilter can have other shapes and configurations than what is shown in the figures. The $O_2$-containing gas can be a mix of two or more gases, and even include waste gas or gases to be treated. The composition of the gas may vary over time. The top wall 16 may be omitted on the biofilter housing. The upper and lower portions of the biofilter do not necessarily have the same height. The gas collector can be operated continuously or intermittently. The addition of waste liquid or gas can be continuous or intermittent. Likewise, the purified liquid and the remaining gas not retrieved by the gas collector can be retrieved continuously or intermittently. The purified liquid exiting the biofilter is not necessary harmless for the environment and may sometime require additional treatment or be sent to one or more additional biofilters before final disposition. The gas removed by the gas collector may enter therein using the pressure inside the housing or with the assistance of a gas pump (not shown) creating a negative pressure. Optionally, a protective and/or deodorizing top layer comprising of coniferous bark can be provided onto layer 106 shown in FIG. 2. Other devices, such as valves, sensors, liquid pumps, pipes, control panels, etc. can be provided to assist the operation of the biofilter.

What is claimed is:

1. A biofilter for purifying a waste liquid, the biofilter comprising:
 a housing having an upper portion and a lower portion;
 a waste liquid inlet located in the upper portion of the housing;
 at least one layer of filtering material substantially comprised of organic material contained in the housing and disposed to receive the waste liquid therethrough, for supporting microorganisms capable of degradation of pollutants contained in the waste liquid under action of $O_2$;
 a forced $O_2$-containing gas supply in gas communication with an inlet located in the lower portion of the housing;
 a purified liquid outlet located in the housing below the gas inlet; and
 a gas collector located in the housing below at least a portion of said layer and above the gas inlet to retrieve at least some of the gas from inside the housing, thereby progressively reducing the remaining gas passing through said layer portion to control the proliferation of said microorganisms for limiting filter material clogging.

2. The biofilter of claim 1, wherein the housing is closed at a top section thereof by a top wall, said biofilter further comprising a gas vent located in the upper portion of the housing and above said waste liquid inlet, said gas vent being in gas communication with said gas collector to allow the retrieved gas to escape out of the biofilter.

3. The biofilter of claim 1, wherein there are one, or more layers of filtering material being superjacent to said layer and through which the remaining gas is passing, each said superjacent layer having a retention capacity lower than that of said layer.

4. The biofilter of claim 1, wherein said portion of filtering material is further supporting microorganisms capable of degradation of the pollutants in absence of $O_2$ which proliferate as said remaining gas is progressively reduced.

5. The biofilter of claim 1, wherein said layer is located above said gas collector and there is one or more layers of filtering material located below said gas collector, at least a portion of said one or more layers being located above said $O_2$-containing gas inlet.

6. The biofilter of claim 5, wherein there is one or more further layers of filtering material being superjacent to said layer located above said gas collector, each said further layer having a retention capacity lower than that of said layer located above said gas collector.

7. A method of purifying a waste liquid in a biofilter having at least one layer of filtering material substantially comprised of organic material for supporting microorganisms capable of degradation of pollutants contained in the waste liquid under action of $O_2$, the method comprising:

providing the waste liquid through said layer, the waste liquid generally flowing downwards by gravity;

supplying a forced $O_2$-containing gas at a level that is below said layer, the gas generally flowing upwards;

retrieving at least some of the upwardly moving gas inside the biofilter at a level that is below at least a portion of said layer and that is above the level at which the $O_2$-containing gas is supplied, thereby progressively reducing the remaining gas upwardly moving through said layer portion to control the proliferation of said microorganisms for limiting filter material clogging; and retrieving a purified liquid from inside the biofilter at a level that is below where the $O_2$-containing gas is supplied.

8. The method of claim 7, wherein the proportion of the upwardly moving gas retrieved from inside the biofilter is from about 5 to 100%.

9. The method of claim 7, wherein there is one or more layers of filtering material being superjacent to said layer, each said superjacent layer having a retention capacity lower than that of said layer, wherein said upwardly moving gas is retrieved for progressively reducing the remaining gas upwardly moving through said superjacent layer of filtering material.

10. The method of claim 7, wherein said portion of filtering material is further supporting microorganisms capable of degradation of the pollutants without action of $O_2$ which proliferate as said remaining gas is progressively reduced.

* * * * *